July 9, 1968  C. C. FURER  3,391,958

GLASS GRIPPING TONGS WITH BALLAST

Filed April 27, 1967  2 Sheets-Sheet 1

INVENTOR
CECIL C. FURER

BY Chisholm and Spencer

ATTORNEYS

July 9, 1968 C. C. FURER 3,391,958

GLASS GRIPPING TONGS WITH BALLAST

Filed April 27, 1967 2 Sheets-Sheet 2

INVENTOR
CECIL C. FURER

BY
ATTORNEYS

United States Patent Office 3,391,958
Patented July 9, 1968

3,391,958
GLASS GRIPPING TONGS WITH BALLAST
Cecil C. Furer, Sarver, Pa., assignor to Pittsburgh Plate
Glass Company, Pittsburgh, Pa., a corporation of
Pennsylvania
Filed Apr. 27, 1967, Ser. No. 634,234
6 Claims. (Cl. 294—118)

ABSTRACT OF THE DISCLOSURE

Tongs for gripping glass sheets for thermal treatment having glass engaging elements and heat absorbing masses supported by said glass engaging elements in sufficiently close proximity to a glass sheet portion gripped by said glass engaging elements to retard the heating rate of said glass sheet portion compared to that of the main body of the glass sheet remote from said heat absorbing masses. The heating rate of the tong gripped glass sheet is correlated with the amount of mass added so that when the main body of glass reaches an elevated temperature above the strain point suitable for further processing the glass sheet portion reaches a temperature between the strain point of the glass and the temperature of the main body. This reduces the tendency of the tong gripping elements to penetrate and distort the heated glass sheet. Different masses may be added to tongs gripping different portions of the gripped glass sheets.

This invention relates to glass gripping tongs with ballast, and particularly refers to tongs adapted to suspend glass sheets and the like during thermal treatment. The tongs have arms pivoted together and glass engaging elements carried by the arms. The arms and their glass engaging elements are arranged to urge the glass engaging elements toward each other when the tongs are suspended so as to grip the glass sheet therebetween.

Glass sheets have been suspended by tongs which grip the upper glass sheet surfaces near the upper glass edge for thermal treatment involved in tempering, coating, press bending, and combinations of these operations which include conveying the glass sheets through atmospheres of different temperatures where the glass is subject to such treatment.

The glass contacting elements of the prior art tongs left something to be desired. They depended primarily on the gripping force resulting from adjusting the pivot points of the respective tong arms to produce a mechanical advantage that provided a maximum gripping force per unit weight of tong. At the same time, the prior art tried to make the glass gripping tongs as small as possible in the belief that such tongs operated efficiently by providing minimum obstruction to the application of heat to the glass during the heating of the glass to an elevated temperature above its strain point necessary for working the glass. It was also believed that tongs having small dimensions would interfere to a minimum degree with the free flow of fluid used to coat or temper the heated glass sheets.

Traditionally, the glass engaging elements of tongs have been in the form of stainless steel pins whose pointed extremities penetrated the major surfaces of the glass. When it is necessary to heat glass to a working temperature hotter than 1200 degrees Fahrenheit, the glass softens, permitting penetration of the metal tips of the glass engaging members. The penetrated glass tends to develop vents and other flaws that spoil the optical qualities of the glass and also weaken the glass sheet.

It has been proposed in U.S. Patent No. 3,273,933 to Jochim to incorporate crystalline grains in a metal binder and have only the crystalline grains contact the glass. Such tongs are useful as long as the grains remain intact. However, such grains of crystalline material wear quite rapidly and the glass is immediately exposed to direct contact with the metal as in prior art tongs.

In U.S. Patent No. 3,089,727 to Hay, the glass engaging elements are in the form of freely rotatable discs whose peripheral margins engage the glass. Such tongs tend to apply the gripping force over a larger rounded area instead of at a single point and hence result in less damage to the glass surface than pointed tongs. However, the large gripping force applied by the glass gripping members of stainless steel at elevated temperatures required to heat the glass for tempering causes some penetration and optical distortion in the region of the glass that is gripped between the glass engaging discs of the Hay tongs.

It has now been found that it is possible to reduce the glass penetration and distortion resulting from gripping the glass by tongs by providing heat absorbing masses supported by the glass gripping members in sufficiently close proximity to a glass sheet portion gripped by the tongs to retard the rate of temperature increase in said glass sheet portion engaged by said glass engaging members, but sufficiently distant from the main body of the suspended glass sheet to have a negligible effect on the heating rate of said main body in response to exposure of said tong gripped glass sheet to a hot atmosphere. As long as the glass sheet portion engaged by the tongs is heated to the strain point of the glass at least, the glass does not develop "chill crack" or otherwise form an incipient break in said portion. At the same time, the lower temperature of the glass portion engaged by the glass engaging members of the tongs makes the glass less susceptible of distortion by virtue of its engagement by solid members.

The present invention is most easily performed with tongs having glass engaging members that are both readily removable and also capable of supporting masses of metal in close proximity to the glass sheet portion gripped between the glass sheet engaging members. Therefore, while other constructions of tong gripping members can provide adequate results, the best embodiments of the present invention are used with tongs having disc shaped glass engaging members that are readily removed and replaced and can also support metal weights on their upper surfaces as the tongs are hung freely to grip the glass sheets.

The heat absorbing masses carried by the tongs that retard the heating rate of the glass sheet portion engaged by the glass engaging members of the tongs without having a significant effect on the heating rate of the main body of the glass may be any of several embodiments. For example, each mass may comprise a metal cylinder surrounding an axially extending member extending upward from each tong disc. Such a metal cylinder retards the temperature rise of the glass sheet portion gripped between the disc-shaped glass engaging members as the glass is heated to an elevated temperature above the strain point sufficient for further working. The mass of heat absorbing material carried by the tongs in sufficiently close adjacency to the glass sheet portion engaged by the glass engaging members may comprise a number of metal washers supported on each disc. In order for such tongs to work as planned, the glass must be heated to its elevated temperature at a rapid rate so that the difference in response of the main body of the glass and that of the heat absorbing masses added to the tongs to the change in temperature to which they are simultaneously exposed is not reduced by thermal conductivity to the point where the difference in temperature is not significant.

Several preferred embodiments of the present invention will now be described in order to facilitate an understanding of the present invention.

In the drawings which form part of the description, and wherein like reference numerals refer to similar structural elements, FIG. 1 is a fragmentary elevational view of a pair of glass gripping tongs taken across the thickness of the upper portion of a glass sheet;

Figure 1:
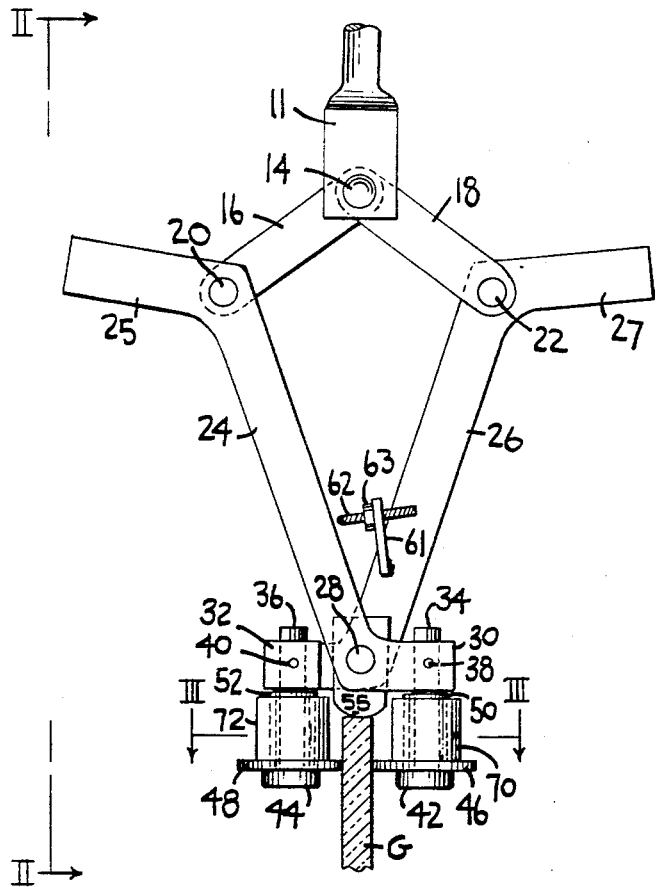

In the drawings, an apertured clevis 11 is carried by a carriage (not shown) supported on a monorail (not shown). The latter extends through a heating furnace of tunnel-like configuration and a fluid imparting apparatus, neither of which is shown but both of which are well known in the art.

The fluid imparting apparatus may be either an air blasting station for tempering or heat-strengthening heated glass sheets suspended on tongs or a fluid spraying station to impart a coating to the tong suspended glass sheets. Since neither the heating furnace nor the air blasting or fluid spraying stations are part of the present invention, they are not described in detail herein.

The apertured clevis 11 supports a tong support pin 12 (FIG. 2) through its aperture. Enlarged head rivets 14 secure the tong support pin 12 in place on the clevis. Links 16 and 18 are pivoted to tong support pin 12 at their upper ends. At their lower ends, links 16 and 18 carry one of a pair of link pins 20 and 22. Link pins 20 and 22 are provided with enlarged head rivets for the same purpose as tong support pin 12.

A tong arm 24 having a horizontal extension 25 is apertured at its upper portion to receive link pin 20 and a tong arm 26 having a horizontal extension 27 is apertured at its upper portion to receive link pin 22. Link pin 20 pivotally attaches the upper portion of tong arm 24 to the lower portion of link 16, whereas link pin 22 pivotally secures the lower portion of link 18 to the upper portion of tong arm 26.

A common hinge pin 28 secures tong arms 24 and 26 to one another near their lower portion. The common hinge pin 28 is apertured to receive a cotter pin 29 (FIG. 2) to avoid separation between the tong arms 24 and 26 at their lower pivoted connection.

Beyond the common hinge pin 28, tong arm 24 forms a lower apertured extension 30 and tong arm 26 forms a similar apertured extension 32. A rod 34 extends through a vertical aperture in apertured extension 30 and a similar rod 36 extends through a vertical aperture in apertured extension 32. Each rod has a diametrically extending hole that matches with cross holes extending horizontally through the apertured extensions 30 and 32. This permits cotter pins 38 and 40 to secure the rods 34 and 36 to extensions 30 and 32.

The lower end of rod 34 has an enlarged head 42 and the lower end of rod 36 has a similar enlarged head 44. A first glass engaging member comprising a disc 46 is rotatably mounted around rod 34 and makes bearing contact with the upper surface of head 42. Another glass engaging member comprising a disc 48 is similarly mounted around rod 36 to make bearing contact with the upper surface of head 44. Each disc is apertured and forms a bottom flange of a flanged sleeve. A sleeve 50 extends upward from the apertured disc 46 and another sleeve 52 extends upward from apertured disc 48. The sleeves 50 and 52 form a unitary structure with the apertured discs and are rotatably mounted around rods 34 and 36 respectively. The discs 46 and 48 have larger diameters than the heads 42 and 44 and are concentrically mounted about the rods 34 and 36 respectively. Thus, their peripheral edges, which are about .06 inch thick, make free rotating contact with the opposite major surfaces of a glass sheet G.

It is thus seen that the discs 46 and 48 serve as glass engaging members carried by the tong arms 24 and 26 wherein the arms 24 and 26 and the glass engaging members 46 and 48 are arranged to urge the glass engaging members toward each other when the tongs are freely suspended. It is also seen that the rods 34 and 36 with their enlarged heads 42 and 44 serve as axially extending support members for the discs 46 and 48. The rods are replaced from the tongs by manipulating cotter pins 38 and 40 and readily reengaged to the tongs as needed.

The tongs are also provided with a stop member 55 formed as a thin shim having a convexly rounded bottom edge that contacts the upper edge of the glass sheet G to prevent the latter from entering too deeply into the tongs. By controlling the uppermost position of the glass within the tongs, any tong marking is limited to a location very close to the uppermost edge of the glass and is hidden in the frame within which the fabricated glass article is installed. Tongs provided with such a stop are described and claimed in U.S. Patent No. 2,991,114 to Lee R. Robinson.

The improved tongs of the present invention were also provided with a limit means 60 to limit the closest approach of the glass engaging elements to one another to about .09 inch for tongs processing glass sheets of ⅛ inch thickness or about .16 inch for processing glass sheets of 3/16 inch thickness or about .22 inch for processing glass sheets of ¼ inch thickness. The limit means 60 comprises an apertured plate 61 with an externally threaded shaft 62 adjustable lengthwise through the aperture in plate 61 and a lock nut 63 to fix the position of the shaft 62 relative to plate 61. The plate 61 is welded to the tong arm 26 with shaft 62 extending toward the side wall of tong arm 24. When the glass engaging members (tong discs 46 and 48) engage the heat-softened glass sheet G, their penetration into the glass is limited by the end of shaft 62 abutting the side wall of tong arm 24, thus preventing further tong penetration into the glass. However, this limit means 60 is a device needed with prior art tongs to control maximum tong penetration and is only included with the presently disclosed tongs as a safety feature in case of accidental overheating of the glass due to temporary loss of furnace control.

The tongs are also provided with additional masses of heat absorbing material 70 and 72 in the form of cylinders, preferably of metal. Metal mass 70 is mounted around sleeve 50 with its bottom edge resting on the upper surface of disc 46. Metal mass 72 is similarly mounted around the outer surface of the sleeve 52 with its bottom edge resting on the upper surface of disc 48. The metal masses 70 and 72 have sufficient thermal capacity to react more slowly than the glass sheet to a change in temperature. The metal masses 70 and 72 are located in sufficiently close proximity to the glass engaging members 46 and 48 to affect the rate of temperature change of the glass sheet portions in the vicinity of the glass engaging members. Therefore, when a glass sheet is gripped by tongs having additional heat absorbing masses 70 and 72 attached thereto and the tong supported glass sheet is introduced into a furnace, the metal masses carried by the tongs selectively absorbs heat from the atmosphere in the vicinity of the upper edge portion of the glass sheet gripped by the tongs until such time as its temperature reaches that of the surrounding atmosphere. Since most glass sheet treatment furnaces heat the main body of the glass sheet to an elevated temperature above its strain point that is required for further processing in a few minutes, and since the ability of the metal masses to absorb heat from the surrounding atmosphere diminishes rapidly with increased distance from the metal masses, the metal masses act as means to retard the heating of the portion of the glass sheet adjacent the tongs, but have no significant effect on the rate of heating the main body of the glass sheet.

Glass sheets gripped by tongs having means for retarding the rate of temperature change in a glass sheet portion engaged by glass engaging members were compared with glass sheets gripped by tongs of the prior art. The glass sheets gripped by the tongs of the present invention had vastly superior optical properties characterized by less distortion and less visible tong penetration marks than glass sheets subjected to the same temperature treatment, but gripped by tongs omitting the heat-absorbing metal masses.

It is believed that the superior optical properties of tempered glass sheets produced by heating them to a temperature of their main body portion of about 1220 degrees Fahrenheit in less than four minutes followed by sudden quenching resulted from the ability of the metal masses to retard the heating rate of the glass sheet portion in the vicinity of the glass gripping members. The latter glass sheet portion was more resistant to tong penetration and distortion resulting from tong movement relative to the glass during the time the main body of glass was heated to its elevated temperature because the latter portion never reached the elevated temperature of the main body before chilling started.

However, unless the temperature of the glass sheet portion in the vicinity of the glass gripping members of the tongs reached the strain point of the glass, the glass became likely to be rejected for "chill cracking." This experience indicated the importance of keeping the mass of heat absorbing material within limits to provide sufficient mass to retard the heating of the glass sheet portion near the tongs and yet insufficient mass to prevent the latter glass sheet portion from reaching the strain point of glass.

For tongs of stainless steel comprising arms 3 inches long by 3/8 inch wide by 3/16 inch thick having apertured extensions about 3/8 inch thick apertured to receive pins one inch long and 3/16 inch in diameter with stops of shim stock 1/32 inch thick and extending with an arcuate bottom edge of a tong-gripped glass sheet about 3/16 inch from the tongs, the glass gripping elements used were apertured discs 3/4 inch in diameter and 1/16 inch thick attached to the bottom of sleeves 1/16 inch thick and 1/2 inch tall having an outer diameter of about 5/16 inch. The enlarged heads were 5/16 inch in diameter and 1/8 inch thick and the metal masses were cylinders 3/8 inch high, having walls 1/8 inch thick and an outer diameter of 11/16 inch.

In processing glass sheets 3/16 inch thick, the tongs were heated to a temperature of between about 150 and 200 degrees Fahrenheit, as suggested in an invention of Samuel L. Seymour, described and claimed in copending patent application Ser. No. 634,263, filed Apr. 27, 1967. Glass sheets at normal room temperature (about 80 degrees Fahrenheit) were inserted into the tongs for gripping thereby. The tongs and their supported glass sheets were heated in an enclosed furnace for about 3 minutes and 45 seconds and immediately removed from the furnace for quenching by air blasts through opposed sets of nozzles about 5 inches apart blasting air against the opposite glass sheet surfaces at a plenum pressure of 8 to 10 ounces per square inch. The nozzles of 1/2 inch diameter circular configuration were arranged in diamond array on 2 inch centers and were moved in circular paths of 2 inch diameter to provide overlapping of the area of glass sheet swept by each nozzle. Such a pattern of overlapping air blasts, nozzle arrangements and plenum pressures is well known in the art and details vary for treating glass sheets of different thickness, chemical composition and thermal history.

It was found that a smaller gripping force sufficed to hold the glass sheets initially engaged by the heated tongs. By engaging the glass sheets with relatively hot tongs, the coefficient of friction between the glass and the tongs became sufficiently high to reduce the gripping force needed and therefore, reduced the tendency of the tongs to penetrate into the glass and distort the surface.

Figure 2:
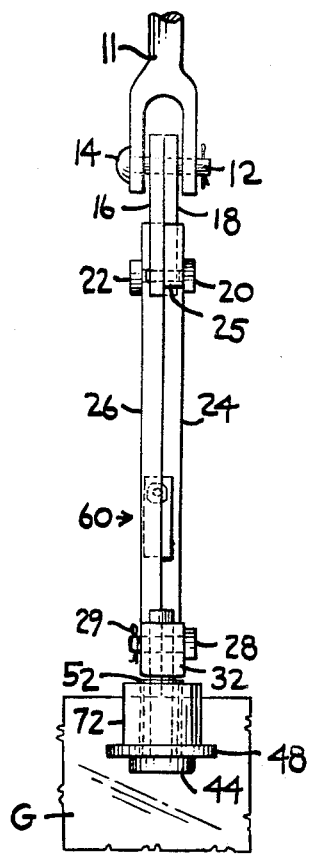
FIG. 2 is an end view taken along the lines II—II of FIG. 1.
Figure 3:
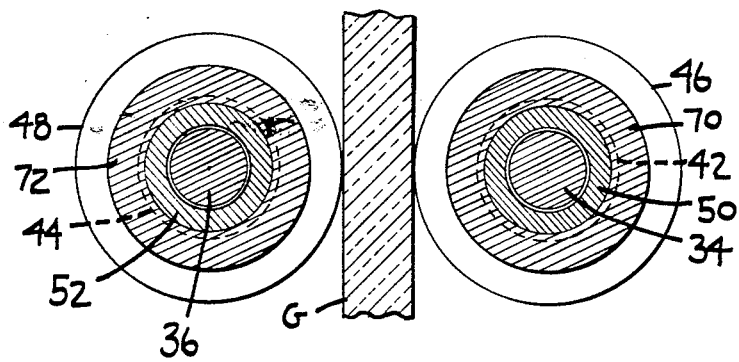
FIG. 3 is a fragmentary sectional view of one embodiment of glass engaging member as taught by the present invention taken along the lines III—III of FIG. 1.

The use of metal masses 70 and 72 in the form of cylinders attached to the tong arms as depicted in FIGS. 1 to 3 represents one embodiment of apparatus capable of accomplishing the benefits of the present invention. Other tong structures capable of keeping the glass sheet portion from tong penetration and/or distorting locally because of tong pull are shown in detail in FIGS. 5 and 6.

Figure 4:
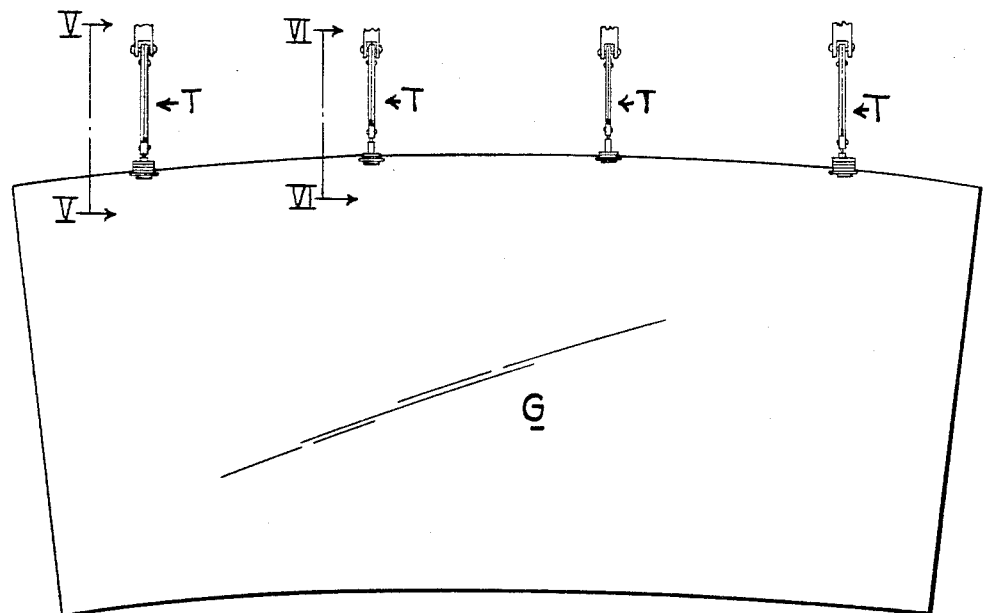
FIG. 4 is a fragmentary elevational view of an elongated glass sheet gripped by tongs of different embodiments of the present invention used to fabricate a tempered automobile backlight.

In FIG. 4, an elongated glass sheet G having the outline required for a curved automobile backlight is shown gripped by four tongs T. Two of the tongs T engage the glass sheet near the longitudinal edges of the glass sheet. The other two tongs engage the glass sheet remote from its longitudinal edges. Since the leading and trailing edge portions tend to reach a higher temperature than the intermediate portions of the glass during rapid heating, a greater amount of heat absorbing mass is supported by the tongs gripping the leading and trailing edge portions of the glass than its intermediate portion.

Figure 5:
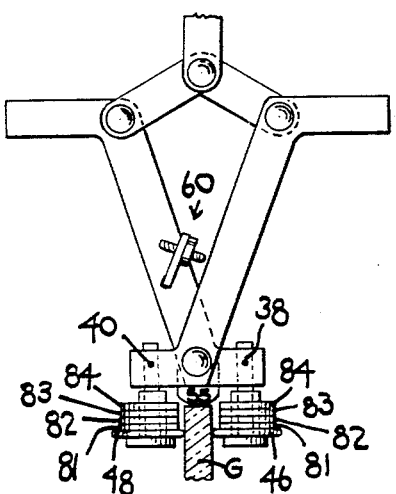
FIGS. 5 and 6 are fragmentary sectional views taken along the lines V—V and VI—VI of FIG. 4, showing details of the structure of the tongs used to support different portions of the elongated glass sheet.
Figure 6:
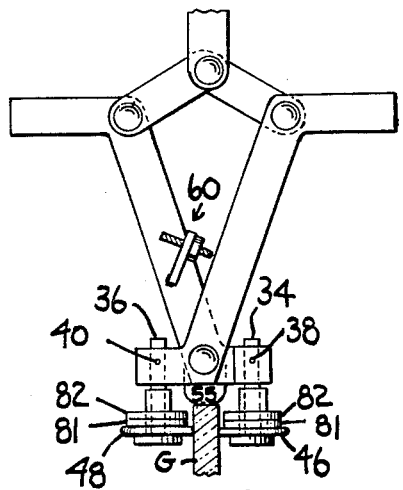

For example, the tongs T engaging the glass sheet leading and training edge portions are provided with four washers 81, 82, 83 and 84 resting on each disc 46 or 48, as shown in FIG. 5, whereas FIG. 6 shows tongs T engaging the intermediate portion of the glass sheet G provided with two washers 81 and 82 for each disc 46 or 48. Preferably, the washers are 1/8 inch thick metal, such as stainless steel.

The tong structure containing the glass gripping members in the form of freely rotatable discs is described and claimed in U.S. Patent No. 3,089,727 to William J. Hay. The prior art tongs have glass engaging members of various shapes made of stainless steel. The discs 46 and 48, which form the glass engaging members of the tongs of the preferred embodiment of the present invention are preferred because of their ability to support the additional heat absorbing masses. It is understood, however, that the additional heat absorbing masses may be supported by glass engaging members of various configurations without departing from the spirit of the present invention.

The form of the invention shown and described in this disclosure represents an illustrative preferred embodiment and several variations thereof. It is understood that various changes may be made without departing from the spirit of the invention as defined in the claimed subject matter that follows.

What is claimed is:

1. In combination with tongs adapted to suspend glass sheets and the like for thermal treatment and which have arms pivoted together and disc-shaped glass engaging members carried by said arms and a spacer sleeve mounted coaxially with said glass engaging member for spacing said glass engaging members from the edge surface of a suspended glass sheet, the arms and glass engaging members being arranged to urge the peripheral surfaces of said disc-shaped glass engaging members toward each other when the tongs are suspended, the improvement comprising a heat absorbing member surrounding said spacer sleeve and having sufficient thermal capacity to retard the rate of temperature change in a glass sheet portion engaged by said glass engaging members compared to that of an equivalent area of glass sheet suspended from said tongs remote from said glass engaging members in response to a change in environmental temperature to enhance the resistance of said engaged glass sheet portion to penetration by said glass engaging members but insufficient thermal capacity to prevent said glass sheet portion from being heated to the strain point of the glass when the main body of said glass sheet is heated to an elevated temperature above the strain point sufficient for further working.

2. Tongs as in claim 1, wherein said glass engaging members comprise discs making peripheral contact with a glass sheet portion gripped by said glass engaging members and each of said heat absorbing members comprises a metal body carried by each of said discs.

3. Tongs as in claim 1, wherein said heat absorbing member is a metal cylinder.

4. Tongs as in claim 1, wherein said heat absorbing member comprises a plurality of metal washers.

5. In combination with tongs as in claim 1, another set of tongs for supporting said glass sheet in an area that responds at a different rate of heating to exposure to a hot atmosphere than said glass sheet portion engaged by said glass engaging members of the tongs of claim 1, said other set of tongs being provided with heat absorbing members having different thermal capacity than those provided with the tongs of claim 1.

6. The combination of tongs as in claim 5 for supporting an elongated glass sheet, wherein said tongs gripping the glass sheet near its leading and trailing edges carry more additional heat absorbing mass than tongs gripping the intermediate portion of the glass sheet.

References Cited

UNITED STATES PATENTS

| | | | |
|---|---|---|---|
| 2,710,493 | 6/1955 | Glynn | 294—119 |
| 3,089,727 | 5/1963 | Hay | 294—118 |

EVON C. BLUNK, *Primary Examiner.*

EDWARD A. SROKA, *Examiner.*

R. D. GUIOD, *Assistant Examiner.*